US008916042B2

(12) United States Patent
Mazyar et al.

(10) Patent No.: US 8,916,042 B2
(45) Date of Patent: Dec. 23, 2014

(54) UPGRADING HEAVY OIL AND BITUMEN WITH AN INITIATOR

(75) Inventors: Oleg A. Mazyar, Houston, TX (US); Gaurav Agrawal, Aurora, CO (US)

(73) Assignee: Baker Hughes Incorporated, Houston, TX (US)

( * ) Notice: Subject to any disclaimer, the term of this patent is extended or adjusted under 35 U.S.C. 154(b) by 273 days.

(21) Appl. No.: 13/526,786

(22) Filed: Jun. 19, 2012

(65) Prior Publication Data
US 2013/0334100 A1  Dec. 19, 2013

(51) Int. Cl.
*C10G 9/00* (2006.01)

(52) U.S. Cl.
USPC .......................................................... 208/106

(58) Field of Classification Search
CPC ................... C10G 2300/80; C10G 2300/4037; C10G 29/02; C10G 15/08; C10G 9/02; C10G 9/007
USPC .......................................................... 208/106
See application file for complete search history.

(56) References Cited

U.S. PATENT DOCUMENTS

| | | | | |
|---|---|---|---|---|
| 4,298,455 A | * | 11/1981 | Huang | 208/48 AA |
| 4,592,826 A | * | 6/1986 | Ganguli | 208/407 |
| 2003/0196789 A1 | | 10/2003 | Wellington et al. | |
| 2005/0014902 A1 | | 1/2005 | McMahon et al. | |
| 2006/0021907 A1 | | 2/2006 | Varadaraj | |
| 2009/0130732 A1 | | 5/2009 | Fedorak et al. | |
| 2011/0147266 A1 | | 6/2011 | Choi et al. | |
| 2013/0161010 A1 | * | 6/2013 | Blom et al. | 166/305.1 |

OTHER PUBLICATIONS

Reyniers et al , Carbon-Centered Radical Addition and beta-Scission Reactions: Modeling of Activation Enrgies and Pre-Exponential Factors, ChemPhysChem, 2008, 9, 124-140.*

Ucdavis Chemwiki, [online]; retrieved Apr. 16, 2012]; retrieved from the Internet http://chemwiki.ucdavis.edu/Organic_Chemistry/Organic_Chemistry_With_a_Biological_Emphasis/Chapter_17%3A_Radical_reactions/Section_2%3A_$_{Radical}$_chain_reactions. Organic Chemistry With a Biological Emphasis by Tim Soderberg (University of Minnesota, Morris), "Section 17.2: Radical chain reactions," 9p.

Aaron G. Vandeputte et al., "Theoretical Study of the Thermodynamics and Kinetics of Hydrogen Abstractions from Hydrocarbons," J. Phys. Chem. A 2007, pp. 11771-11786.

Carolyn M. Blanchard et al., "Free Radical Chain Reactions of Bitumen Residue," Department of Chemical and Materials Engineering, University of Alberta, Edmonton, AB T6G 266, pp. 137-141.

Cesar Ovalles et al., "Upgrading of Extra-Heavy Crude Using Hydrogen Donor under Steam Injection Conditions. Characterization by Pyrolysis GC-MS of the Asphaltenes and Effects of a Radical Initiator," Fuel Chemistry Division Preprints 2003, 48 (1), pp. 59-60.

Bowling Green State University, [online]; [retrieved Apr. 16, 2012]; retrieved from the Internet Chemistry 442/542—Syllabus (http://www.bgsu.edu/departments/chem/faculty/pavel/Chem542/442542syllabus.htm; Chapter A12 and B10: "Radical Reactions", http://www.bgsu.edu/departments/chem/faculty/pavel/Chem542/Chapter%2014%20-%20542.pdf) written by Prof. Pavel Anzenbacher, Jr., Ph.D. (http://www.bgsu.edu/departments/chem/pavel.html), 14p.

California State Univeristy Dominguez Hills, [online]; [retrieved Apr. 16, 2012]; retrieved from the Internet http://chemistry2.csudh.edu/rpendarvis/Radicals.html, "Free Radical Reactions—One Electron Intermediates," Chemistry 240 Spring 2001, 5p.

F. J. Stubbs et al., "II. Hydrocarbon Reactions, A. Thermal Reactions, The Thermal Decompostions Of Hydrocarbons," Downloaded by Texas A&M University on Apr. 16, 2012, Published on Jan. 1, 1951 on http://pubs.rsc.org | doi:10.1039/DF9511000129, pp. 129-136.

Hiroiku Kawai et al., "Free radical behavior in thermal cracking reaction using petroleum heavy oil and model compounds," Catalysis Today 43 (1998), pp. 281-289.

Jiunn-Ren Lin et al., "An Upgrading Process through Cavitation and Surfactant," Energy & Fuels, vol. 7, No. 1, 1993, pp. 111-118.

Maarten K. Sabbe et al., "Hydrogen Radical Additions to Unsaturated Hydrocarbons and the Reverse b-Scission Reactions: Modeling of Activation Energies and Pre-Exponential Factors," Chem. Phys. Chem. 2010, 11, pp. 195-210.

Maarten K. Sabbe et al., "Modeling the influence of resonance stabilization on the kinetics of hydrogen abstractions," Physical Chemistry Chemical Physics, 2010, 12, pp. 1278-1298.

Maarten K. Sabbe et al., "Carbon-Centered Radical Addition and b-Scission Reactions: Modeling of Activation Energies and Preexponential Factors," ChemPhysChem 2008, 9, pp. 124-140.

Maitland Jones, Jr., "Radical Reactions," Organic Chemistry, W.W. Norton & Company, New York, NY, 1997, pp. 490-495.

Maitland Jones, Jr., "Radical Reactions," Organic Chemistry, W.W. Norton & Company, New York, NY, 1997, pp. 448-459, Jun. 2, 2014.

Mitra Sadeghipour, "Hydrocarbon Functionalization via a New Free Radical-Based Condensation Reaction," Dissertation submitted to the Faculty of the Virginia Polytechnic Institute and State University in partial fulfillment of the requirement for the degree of, Doctor of Philosophy in, Chemistry; Jul. 7, 1998; Blacksburg, Virginia; Copyright 1998, Mitra Sadeghipour, 151p.

(Continued)

*Primary Examiner* — Randy Boyer
*Assistant Examiner* — Juan Valencia
(74) *Attorney, Agent, or Firm* — Cantor Colburn LLP

(57) ABSTRACT

A method for upgrading a heavy oil includes: disposing an initiator in a heavy oil environment, the heavy oil environment including a heavy oil; producing a radical from the initiator; contacting the heavy oil with the radical; and converting the heavy oil to upgraded oil.

20 Claims, No Drawings

(56) References Cited

OTHER PUBLICATIONS

Nikolai N. Semenov, "Some problems relating to chain reactions and to the theory of combustion," Nobel Lecture, Dec. 11, 1956, 28p.
Applications: Free Radical Initiators, "Polymer Handbook", Eds. Brandrup, J; Immergut, E.H.; Grulke, E.A., 4th Edition, John Wiley, New York, 1999, II/2-69; Aldrich Catalog No. Z412473, 2p.
Notification of Transmittal of the International Search Report and the Written Opinion of the International Searching Authority, or the Declaration; PCT/US2013/041370; Aug. 19, 2013.

* cited by examiner

UPGRADING HEAVY OIL AND BITUMEN WITH AN INITIATOR

BACKGROUND

Heavy oils and natural bitumens contain a number of high molecular weight compounds and aggregates that cause challenges for upgrading such oil. These challenges impact producing and refining heavy oil. Components of heavy oil and bitumen include paraffin, naphthene, olefin, wax, resin, asphaltene, and the like. The chemical structures of these components include unsaturated hydrocarbon or aromatic portions. Heavy oil also contains heavy metals (e.g., vanadium, nickel, molybdenum, etc.) as well as heteroatoms (e.g., nitrogen, sulfur, and oxygen). The heteroatoms may substitute for carbon atoms in the various heavy oil components. Some of these components are toxic and negatively affect the environment due to, for example, aromatic content.

Heavy oil has been characterized as having an API gravity from 10° to 20°. Extra-heavy oil and natural bitumen display an API gravity lower than 10°. The difference between extra-heavy oil and bitumen is based on a viscosity at reservoir conditions: the viscosity of extra-heavy oil is lower than 10,000 centipoise (cP), while the viscosity of bitumen is higher than 10,000 centipoise (cP). The viscosity of heavy oil and bitumen, further referred to as heavy oil, is one reason why their production has proven difficult, expensive, and time consuming. Furthermore, heavy oil may deposit in the pores of formations, blocking the flow of fluids. Additionally, components of heavy oil, e.g., asphaltenes, can precipitate from a stream of oil and coat boreholes, production tubing, and transport lines. Before use, heavy oil is upgraded, which is challenging for many reasons including high temperature and catalyst requirements as well as interference by organometallic compounds associated with heteroatoms in the heavy oil components. Moreover, heavy oil components can foul processing equipment and poison catalysts. Thus, materials and methods for upgrading heavy oil would be well received in the art.

BRIEF DESCRIPTION

The above and other deficiencies of the prior art are overcome by, in an embodiment, a method for upgrading a heavy oil, the method comprising: disposing an initiator in a heavy oil environment, the heavy oil environment including a heavy oil; producing a radical from the initiator; contacting the heavy oil with the radical; and converting the heavy oil to upgraded oil.

DETAILED DESCRIPTION

A detailed description of one or more embodiments are presented herein by way of exemplification and not limitation.

It has been found that upgrading heavy oil to upgraded oil using initiators herein decreases phase separation, coke formation, adverse molecular interactions, and catalyst deactivation. Upgrading (also referred to as converting) heavy oil includes decreasing a molecular weight, viscosity, or boiling point or increasing the quality of the upgraded oil as compared with the heavy oil. Moreover, the initiator upgrades heavy oil without a catalyst.

In an embodiment, a method for upgrading heavy oil includes disposing an initiator in a heavy oil environment, producing a radical from the initiator, and contacting a heavy oil in the heavy oil environment with the radical to upgrade the heavy oil by producing upgraded oil.

According to an embodiment, the initiator comprises a peroxide, azo compound, ether, or a combination comprising at least one of the foregoing. Exemplary peroxides include tert-amyl peroxybenzoate; 4,4-azobis(4-cyanovaleric acid); 1,1'-azobis(cyclohexanecarbonitrile); 2,2'-azobisisobutyronitrile; benzoyl peroxide; 2,2-bis(tert-butylperoxy)butane; 1,1-bis(tert-butylperoxy)cyclohexane; 2,5-bis(tert-butylperoxy)-2,5-dimethylhexane; 2,5-bis(tert-butylperoxy)-2,5-dimethyl-3-hexyne; bis(1-(tert-butylperoxy)-1-methylethyl)benzene; 1,1-bis(tert-butylperoxy)-3,3,5-trimethylcyclohexane; tert-butyl hydroperoxide; tert-butyl peracetate; tert-butyl peroxide; tert-butyl peroxybenzoate; tert-butylperoxy isopropyl carbonate; cumene hydroperoxide; cyclohexanone peroxide; dicumyl peroxide; lauroyl peroxide; 2,4-pentanedione peroxide; peracetic acid; potassium persulfate; acetone peroxide; methyl ethyl ketone peroxide; 1,3,3,3-tetramethylbutyl peroxybenzoate; tert-amyl peroxy-m-methylbenzoate; tert-hexyl peroxy-m-methylbenzoate; 1,1,3,3-tetramethylbutyl peroxy-m-methylbenzoate; tert-hexyl peroxy-p-methylbenzoate; tert-hexyl peroxy-o-methylbenzoate; tert-hexyl peroxy-p-chlorobenzoate; bis(tert-hexyl peroxy)phthalate; bis(tert-amylperoxy)isophthalate; bis(tert-hexyl peroxy)isophthalate; bis(tert-hexyl peroxy)terephthalate; tris(tert-hexyl peroxy)trimellitate; 1,1-bis(tert-hexylperoxy)-3,3,5-trimethylcyclohexane; 1,1-bis(tert-hexylperoxy)cyclohexane; 1,1-bis(tert-butylperoxy)cyclododecane; 2,2-bis(tert-butylperoxy)octane; n-butyl-4,4-bis(tert-butylperoxy)butane; n-butyl-4,4-bis(tert-butylperoxy)valerate; tert-butyl cumyl peroxide; α,α'-bis(tert-butylperoxy-m-isopropyl)benzene; α,α'-bis(tertbutylperoxy)diisopropylbenzene; 2,5-dimethyl-2,5-di(t-butylperoxy)hexane; acetyl peroxide; isobutyryl peroxide; octanoyl peroxide; decanoyl peroxide; 3,5,5-trimethyl hexanoyl peroxide; 2,4-dichlorobenzoyl peroxide; m-toluoyl peroxide; tert-butyl peroxyacetate; tert-butyl peroxyisophtalate; tert-butyl peroxy-2-ethylhexanoate; tert-butyl peroxylaurate; tert-butyl peroxybenzoate; di-tert-butyl peroxyisophthalate; 2,5-dimethyl-2,5-di(benzoylperoxy)hexane; tert-butyl peroxymaleic acid; tert-butyl peroxyisopropylcarbonate; cumyl peroxyoctate; tert-butyl hydroperoxides; cumene hydroperoxides; diisopropylbenzene hydroperoxides; 2,5-dimethylhexane-2,5-dihydroperoxide; 1,1,3,3-tetramethylbutyl hydroperoxides; hydrogen peroxide; or a combination comprising at least one of the foregoing.

In an embodiment, the initiator is an azo compound, specifically a water soluble azo compound, oil soluble azo compound, or a combination comprising at least one of the foregoing. Exemplary water soluble azo compounds include 2,2'-azobis[2-(2-imidazolin-2-yl)propane]dihydrochloride; 2,2'-azobis[2-(2-imidazolin-2-yl)propane]disulfate dehydrate; 2,2'-azobis(2-methylpropionamidine)dihydrochloride; ,2'-azobis[n-(2-carboxyethyl)-2-methylpropionamidine]hydrate; 2,2'-azobis{2-[1-(2-hydroxyethyl)-2-imidazolin-2-yl]propane}dihydrochloride; 2,2'-azobis[2-(2-imidazolin-2-yl)propane]; 2,2'-azobis(1-imino-1-pyrrolidino-2-ethylpropane)dihydrochloride; 2,2'-azobis{2-methyl-n-[1,1-bis(hydroxymethyl)-2-hydroxyethl]propionamide}; 2,2'-azobis[2-methyl-n-(2-hydroxyethyl)propionamide].

Exemplary oil soluble azo compounds include 2,2'-azobis(4-methoxy-2,4-dimethyl valeronitrile); 2,2'-azobis(2,4-dimethyl valeronitrile); dimethyl 2,2'-azobis(2-methylpropionate); 2,2'-azobis(2-methylbutyronitrile); 1,1'-azobis(cyclohexane-1-carbonitrile); 2,2'-azobis[n-(2-propenyl)-2-methylpropionamide]; 1-[(1-cyano-1-methylethyl)azo]

formamide; 2,2'-azobis(n-butyl-2-methylpropionamide); 2,2'-azobis(n-cyclohexyl-2-methylpropionamide); or a combination comprising at least one of the foregoing.

The ether can contain an alkyl, alkenyl, alkynyl, aryl, or cyclic group, and can include a heteroatom. Exemplary ethers include alkyl ethers (e.g., tert-amyl-methyl ether, methyl-tert-butyl ether, diethyl ether, methyl ethyl ether, diisopropyl ether, ethyl propyl ether, dibutyl ether), vinyl ethers (e.g., ethyl vinyl ether, phenyl vinyl ether), aryl ethers (e.g., dibenzyl ether, diphenyl ether, dinaphthyl ether), mixed ethers (e.g., amyl phenyl ether, methyl benzhydryl ether, benzyl phenyl ether, anisole, phenetole), cyclic ethers (e.g., tetrahydrofuran, dioxane-1,4, dioxane-1,3, crown ethers (e.g., 18-crown-6, 15-crown-5, 12-crown-4, etc.)), polyethers (e.g., dimethoxyethane, diglyme, triglyme, pentaglyme), polyoxyalkylenes (e.g., polyoxyethylene or poly(oxypropylene)), and the like.

In an embodiment, the heavy oil (i.e., a component of the heavy oil) is contacted by a radical produced from the initiator. Components of the heavy oil include paraffin, naphthene, olefin, wax, resin, asphaltene, and the like. The radical can be produced from the initiator in various ways. According to an embodiment, the radical is produced from the initiator by heating the initiator. In this manner, a bond in the initiator is dissociated and homolytically cleaved to produce the radical, for example two radicals by virtue of the bond homolysis. That is, the initiator thermally decomposes to produce a radical. In the case of the peroxide, the oxygen-oxygen single bond is cleaved. Likewise, the azo compound thermally decomposes to generate free radicals and nitrogen gas. The radicals produced from the initiator are not necessarily identical, e.g., with asymmetric substitution in a peroxide or azo compound. In another embodiment, the radical is produced from the initiator by applying acoustic waves to the medium containing the initiator, or by creating an electric discharge in the medium containing the initiator. In an exemplary embodiment, the acoustic wave has an ultrasound frequency, which can induce cavitation. In yet another embodiment, a shock wave is applied to the medium to produce the radical. According to a non-limiting embodiment, the initiator is heated by in-situ combustion, cyclic steam stimulation, steam flooding, steam assisted gravity drainage, hot solvent injection, electromagnetic radiation, a shock wave, electric discharge, or a combination comprising at least one of the foregoing, wherein the electromagnetic radiation includes a microwave frequency, radio frequency, or a combination comprising at least one of the foregoing.

The initiator has a low temperature of activation, i.e., low bond dissociation energy, and thus low temperature for radical formation. In an embodiment, the dissociation temperature of the initiator is low enough so that the initiator dissociates at a temperature lower than cracking reactions of the heavy oil. However, once produced the radicals react with the heavy oil to abstract hydrogen from the heavy oil, leaving a product radical of the heavy oil. It is contemplated that the product radical of the heavy oil is characterized by an unpaired electron left on a carbon atom in the heavy oil by the departure of a hydrogen atom (with its electron) in the abstraction reaction by the radical from the initiator. The product radical (of the heavy oil) reduces the cracking temperature associated with, e.g., β-scission reactions of the heavy oil so that moderate temperatures lead to conversion of the heavy oil to upgraded oil. Thus, in an embodiment, once a hydrogen atom is abstracted by a radical generated from an initiator, a product radical is formed and subjected to or undergoes a β-scission reaction.

The initiator advantageously dissociates to produce radicals at a temperature and with a reaction time (i.e., kinetic parameters) that are effective in initiating heavy oil cracking reactions. In an embodiment, the initiator has a dissociation temperature that is equal to or less than 150° C., specifically 100° C., and more specifically 55° C., relative to a ten-hour half-life of the initiator. In a further embodiment, the initiator has a dissociation temperature that is equal to or greater than 20° C., specifically 40° C., and more specifically 45° C., relative to a ten-hour half-life of the initiator.

In an embodiment, an initiator is introduced into the heavy oil environment containing heavy oil to be upgraded before or after heating the heavy oil environment. Without being bound by theory, some of the bonds found in heavy oil include C—C, C—H, C=C, C—S, C—O, C=O, C—N, C=N, N—H, O—H, S—H and the like. In upgrading the heavy oil, some of these bonds are broken. According to an embodiment, radicals formed from the initiator are used in abstracting hydrogen (including hydrogen from, e.g., C—H, N—H, O—H, and S—H) from the heavy oil. Abstraction of hydrogen generates a product radical in the heavy oil. The unpaired electron in the product radical can be located, e.g., on a carbon atom in a compound of the heavy oil. By producing product radicals, less energy (e.g., a lower temperature) is needed to break bonds in the heavy oil so that lower molecular weight compounds of the upgraded oil can be produced without having to heat the heavy oil to typical pyrolysis temperatures characteristic of breaking, e.g., C—C bonds. By breaking C—C bonds, a reduction in molecular weight and viscosity occurs and is associated with the conversion of heavy oil to upgraded oil.

According to an embodiment, a temperature of the heavy oil environment during upgrading the heavy oil is 300° C. to 1500° C., specifically 400° C. to 1000° C., and more specifically 400° C. to 800° C. In a further embodiment, a pressure of the heavy oil environment during upgrading the heavy oil is 1 atmosphere (atm) to 2100 atm, specifically 1 atm to 1400 atm, and more specifically 3 atm to about 700 atm. In some embodiments, the temperature or pressure applied to the radical is effective for the radical (from the initiator) to abstract hydrogen atoms from the heavy oil at a rate greater than a rate for recombination of radicals or a rate for crosslinking of the heavy oil. Without being bound by theory, it is believed that product radicals of the heavy oil can participate in crosslinking reactions that polymerize the heavy oil, increasing a molecular weight of the heavy oil. These crosslinking reactions compete with cracking reactions of the heavy oil. By controlling the temperature of the heavy oil environment, the cracking reactions can be driven to completion for production of upgraded oil or crosslinking reactions can be suppressed.

According to an embodiment, upgrading the heavy oil can be controlled by varying the amount of the initiator present in the heavy oil environment. The initiator can be present in the heavy oil environment in an amount from 0.01 weight percent (wt %) to 20 wt %, based on the weight of the heavy oil. In another embodiment, the initiator can be present in the heavy oil environment in a concentration from $10^{-4}$ moles per liter (mol/L) to 1 mol/L.

In some embodiments, a solvent can be disposed in the heavy oil environment before or after conversion of the heavy oil to upgraded oil, disposition of the initiator, or production of the radical from the initiator. The solvent can solvate or disperse the upgraded oil or the heavy oil. Solvents can include, for example, naphtha, $CO_2$ (including gas or supercritical fluid), $CS_2$, a hydrocarbon which includes a C1 to C12 alkane, C1 to C12 alkene, C3-C20 aromatic, or a combination comprising at least one of the foregoing. Exemplary solvents are butane, propane, ethane, benzene, toluene, pyridine, furan, o-xylene, dimethyl sulfoxide, tetrahydrofuran, o-dioxane, m-dioxane, p-dioxane, dimethoxyethane, n-methyl-pyrrolidone, n,n-dimethylacetamide, γ-butyrolactone, 1,3-dimethyl-2-imidazolidinone, benzyl benzoate, hexafluorobenzene, octafluorotoluene, pentafluorobenzonitrile, pentafluoropyridine, pyridine, dimethylformamide, hexamethylphosphoramide, nitromethane, benzonitrile, or derivatives thereof.

After contacting the heavy oil with the radicals to form the product radical of the heavy oil, the heavy oil can be cracked, e.g., pyrolyzed, into lower molecular weight molecules at high enough temperatures and pressures to break carbon-carbon bonds in, e.g., hydrocarbon chains. In an embodiment, the energy for such cracking is provided by heating the heavy oil environment. In some embodiments, energy can be imparted in the heavy oil environment by in-situ combustion, cyclic steam stimulation, steam flooding, electric heating (e.g., induction, resistance heating, radio frequency (RF) heating, etc.) or a combination comprising at least one of the foregoing. In an embodiment, the heavy oil environment is a vessel, reservoir, borehole, processing facility, downhole, refinery, pre-refinery facility, production zone, formation, tubular, reactor, or a combination comprising at least one of the foregoing.

Thermal processes such as in situ combustion, cyclic steam stimulation, and steam flooding increase the temperature of a heavy oil environment such that the viscosity of heavy oil decreases. When mobile, the heavy oil can flow and may flow away from a heated portion of the heavy oil environment. As the heavy oil cools, its viscosity increases. Moreover, during cooling, components of the heavy oil can precipitate from heavy oil. The initiators herein produce radicals that react with the heavy oil with subsequent cracking of the heavy oil to produce upgraded oil. The upgraded oil has a lower average molecular weight and lower viscosity than that of the heavy oil. As a result, even if the upgraded oil cools below the temperature at which the initiator produces radicals, the viscosity of the upgraded oil is low enough such that the upgraded oil can flow at a rate effective for use, for example, in production from downhole or during transport.

The upgraded oil has advantageous properties. According to an embodiment, an average molecular weight of the heavy oil is decreased such that the upgraded oil has a lower average molecular weight than that of the heavy oil. In comparing samples of heavy oil and the upgraded oil, an identical volume of a sample of the upgraded oil and heavy oil can be used for comparison. In an additional embodiment, the upgraded oil has a higher API gravity than that of the heavy oil. In a particular embodiment, the API of the upgraded oil is three degrees (3°) or more than the heavy oil, specifically 5° or more, and more specifically 10°. According to an embodiment, the viscosity of the upgraded oil is less than that of the heavy oil. In a particular embodiment, the viscosity of the upgraded oil is less than that of the heavy oil by at least 99%, specifically at least 95% and more specifically at least 90%, based on the viscosity of the heavy oil.

The upgraded oil having these properties is an outcome of using radicals produced from the initiator to abstract hydrogen and commence upgrading of the heavy oil. As mentioned, the initiator and heavy oil environment is subjected to an increased temperature that can occur due to electrical heating, in-situ combustion, steam flooding, cyclic steam stimulation, steam assisted gravity drainage, or the like. During cyclic steam stimulation, high pressure steam is injected into the heavy oil environment with subsequent soaking for a period of time to diffuse the administered heat. Steam flooding includes injection of steam, which increases the temperature of the heavy oil environment and can increase the pressure of the heavy oil environment to urge the upgraded oil down the pressure gradient away from the high pressure source, e.g., toward a production site. Cyclic steam stimulation, steam flooding, and steam assisted gravity drainage are enhanced oil recovery methods. That is, the temperature provided by these techniques alone (typically, less than 350° C.) may be too low for some thermal cracking reactions. While temperatures less than 350° C. can decrease the viscosity of heavy oils by increasing the mobility of the smaller of the heavy oil molecules, larger heavy oil molecules have an even lower mobility and may not be able to flow and, thus, may not be recoverable at temperatures below 350° C. With the addition of the radical initiators herein, the radicals necessary for the hydrogen abstraction reactions (followed by β-scission reaction of heavy oil molecules) can be formed via a low activation energy path of the radical initiator decomposition instead of a high activation energy path for bond cleavage of the heavy oil molecules. Without being bound by theory, in thermal cracking mechanisms, the radical formation reactions by bond cleavage in heavy oil molecules have the highest activation energies. Thus, radical initiator enable in-situ cracking at lower temperatures than heating alone. Further, such radical initiator cracking can be achieved by various steam injection methods. This cracking process can decrease the molecular weight of the heavy oil such that the mobility and flow of heavy oil molecules increases. In an embodiment, the heavy oil that is cracked in the presence of radicals from the initiator can remain in the formation to be stimulated by steam injection methods. Therefore, introduction of the initiators herein combined with steam injection methods improves the recovery efficiency as well as the quality of oil.

In an embodiment, the initiator is disposed outside or near the periphery of a main heating or combustion zone. This may be accomplished by disposal, e.g., injection, of the initiator prior to heating the heavy oil environment. After the initiator is introduced into the heavy oil environment, the initiator can flow or diffuse from its introduction site to another location in the heavy oil environment. If the same injection site is used to introduce heat into the heavy oil environment, such as with injection of gases for in-situ combustion, the timing between the disposal of the initiator and that of the in-situ combustion reagents (e.g., air, steam, etc.) can be adjusted so that the initiator is outside of the main heating or combustion zone. In some embodiments, an initiator is dissolved in a solvent and introduced into the heavy oil environment followed by injecting additional solvent. In this manner, the additional solvent will urge the initiator toward a periphery of a combustion zone.

According to an embodiment, upgrading of the heavy oil occurs outside the combustion zone, in an adjacent cokefaction zone. In the cokefaction zone, heavy fractions that have not been displaced or vaporized can be pyrolyzed. An outer boundary of this zone can be determined or selected by a minimum temperature to maintain or control the pyrolysis process at a selected rate. Since the introduction of an initiator decreases the temperature necessary for maintaining pyrolysis, the boundary of the cokefaction zone is effectively extended (as compared with no initiator present) and, thus, the volume of the heavy oil that can be upgraded increases. More effective upgrading of the heavy oil also reduces the amount of an unrecoverable immobile oil fraction, which can be consumed by the in-situ combustion process.

In an alternative embodiment, multiple injection sites in the heavy oil environment can be used to allow independent introduction of the initiator and heat source at different locations in the heavy oil environment. In an embodiment, a first injection site in the heavy oil environment is used for the initiator, and a second injection site is used for disposing the heat source (e.g., in-situ combustion agents, steam, or the like). Thus, not only is the heavy oil heated by the heating or combustion zone, but the heavy oil also is subjected to radicals from the initiator outside of the combustion zone, e.g., in the adjacent cokefaction zone. Moreover, radicals produced from the initiator can effectively extend the boundaries of the cokefacion zone and, thus, the volume of the heavy oil subjected to upgrading. In another embodiment, the upgraded oil can be dispensed from the heavy oil environment. The location of dispensing the upgraded oil can occur at a location that is closer to a location corresponding to where the radicals from the initiator were produced and further from the heat source (such as a combustion zone or injection site for steam, etc.). Thus, the upgraded oil can be dispensed from the heavy oil environment before high viscosity fluids, e.g., the heavy oil, are incident at the dispensing area, e.g., a production zone, well, or dispensing valve for a vessel containing the heavy oil. Consequently, the initiator provides a high recovery efficiency (i.e., a small amount of an immobile fraction is left in the formation) and higher oil quality (e.g., an increase in API gravity from 5° to 10°) with lower contaminants (e.g., 90% less nickel and vanadium, 30-40% less sulfur).

Thus, according to an embodiment, the heavy oil is converted to upgraded oil via hydrogen abstraction by a radical from the initiator followed by cracking the heavy oil. In a particular embodiment, the upgraded oil is produced from the heavy oil environment that includes a downhole environment, borehole, wellbore, refinery, pre-refinery facility, production zone, formation, reservoir, production tubing, casing, or a combination comprising at least one of the foregoing. The pre-refinery facility can include items such as transportation tubing, processing equipment, storage facilities, and the like. In one embodiment, upgrading the heavy oil occurs prior to producing the upgraded oil. Alternatively, upgrading the heavy oil occurs subsequent to producing the heavy oil.

The initiator can be disposed in the heavy oil environment in various ways. In an embodiment, disposing the initiator includes placing the initiator in a fluid or as part of a downhole element such as on gravel particles in gravel pack, proppant, filter, sand screen. According to an embodiment, the fluid can entrain the initiator to deliver the initiator to the heavy oil environment via, e.g., injection. In another embodiment, the initiator is disposed on a resin that coats gravel in a gravel pack that can cure or coat items in the heavy oil environment, e.g., forming a sand consolidation or filtration element having exposed initiator to initiate cracking of heavy oil in contact with the gravel pack. In yet another embodiment, the initiator is physisorbed or chemically bound to the surfaces of gravel in a gravel pack. In yet another embodiment, the initiator is physisorbed or chemically bound to proppant or resin-coated proppant, which holds the fractures open after a hydraulic fracturing treatment. In still another embodiment, the initiator can be disposed in a matrix. The matrix can disintegrate to release the initiator at a selected time. An example matrix includes a polymer that is water or oil soluble. In yet another embodiment, the radical initiator can be disposed in combination with a catalyst suitable for in situ catalytic cracking, such as a catalyst having faujasite or type Y zeolite as its active component. In yet another embodiment, the radical initiator can be disposed in combination with hydrogen or a hydrogen precursor and a catalyst suitable for in situ hydroconversion and hydrotreatment, such as a conventional sulfided Ni—Mo/$Al_2O_3$ hydrotreating catalyst. The catalyst can be dispersed in a liquid phase or disposed on a substrate, e.g., a gravel pack particle or proppant. In a specific embodiment, a radical initiator is introduced in the presence of a hydrogen precursor (e.g., tetralin) at a temperature of, e.g., 315° C. with or without a catalyst.

In one embodiment, the initiator is thermally decomposed to produce radicals by in-situ combustion. Combustion of heavy oil or coke in a formation can provide heat to make the radicals from the initiator, provide energy to crack the heavy oil after hydrogen abstraction by the radicals, and mobilize the upgraded oil. In a specific embodiment, the hydrocarbon present in a downhole formation can be ignited using injected air or another oxygen source (including pure oxygen, steam, and the like) in the heavy oil environment. According to an embodiment, the method includes increasing the temperature to produce radicals from initiator. Increasing the temperature includes techniques that can elevate the temperature to about 400° C. to about 1200° C., specifically about 400° C. to about 1000° C., and more specifically about 400° C. to about 800° C. Dry air or air mixed with water can be injected. Combustion propagates through the heavy oil environment. In an embodiment, the combustion propagates from an injection well to a production well. In some embodiments, the initiator forms radicals ahead of the combustion gases or fluids and the combustion front. Heat radiates from the combustion zone and increases the temperature of the heavy oil environment to crack the product radicals of the heavy oil after the heavy oil reacts via hydrogen abstraction with the radicals from the initiator.

Disposal of the initiator, steam, in-situ combustion agents (e.g., oxygen source, and the like), catalysts, hydrogen, or hydrogen precursor can be accomplished using, e.g., a vertical or horizontal well. Further, more than one well can be used. In an embodiment, disposing such items in the heavy oil environment includes injecting via an injection well, which is different than a production well. In another embodiment, disposing an item in the heavy oil environment includes injection in a production well. In a further embodiment, injection (i.e., disposal) can occur in one or more vertical wells, horizontal wells, or a combination thereof. In one embodiment, the upgraded oil can be produced in one or more vertical wells, horizontal wells, or a combination thereof. Accordingly, the injected item or subsequent reactions can be controlled and constrained to a certain portion of the heavy oil environment. Moreover, the configuration (e.g., size, number, or spacing) of injection and production sites (e.g., wells) of can be selected for such control. As a result, the combustion front and heating can be established such that a distance that the upgraded oil traverses for production can be minimized or its path of travel optimized to avoid barriers, for example. In certain embodiments, multiple wells can be used such as a multi-spot (e.g., 5-spot) pattern with producing wells (e.g., four producing wells) surrounding an injection well. In a particular embodiment, spacing between wells can be selected based on the surface footprint desired or with respect to physical and chemical properties of initiator disposal with respect to radical production relative to the ensuing cracking reactions following hydrogen abstraction. In some embodiments, the well spacing can be less than 10 acres, specifically less than 5 acres, and more specifically less than 1 acre. In a further embodiment, a vertical well can have multilateral braches. In another embodiment, a horizontal well can have multilateral branches.

In a further embodiment, gravity drainage is used for production of upgraded oil. Here, horizontal wells are positioned such that a first horizontal well is above a second horizontal well. The initiator is injected in the first well, and the initiator diffuses from the first well. Steam is then injected in the first well, heating the heavy oil environment above the first well and between the two wells. The initiator produces radicals that abstract hydrogen from the heavy oil, which is subsequently cracked to produce upgraded oil, and the upgraded oil flows into the second horizontal well. Alternatively, in-situ combustion can occur by injecting an oxygen source in the first well after injection of the initiator followed by making the upgraded oil by hydrogen abstraction by radicals with subsequent cracking of the heavy oil. In another embodiment, heated fluid (e.g., a solvent) can be injected. The solvent can disperse the upgraded oil to increase its production.

Thus, the methods herein can be used to decrease heavy oil viscosity in a heavy oil environment. Initiators can be used to upgrade the oil. In an embodiment, heavy oil that constricts flow in, for example, a tubular, can be upgraded to restore or increase flow in a pipeline. Additionally, upgrading heavy oil can increase permeability in porous media and flow channels. Because of upgrading the heavy oil, the viscosity of the fluid in the heavy oil environment decreases. Lowering the viscosity of the oil improves production efficiency. Additionally, the detrimental effects of asphaltenes, resins, and other heavy oil components can be diminished or eliminated, including alleviation of flocculates that can plug a reservoir or production tubing, restrict flow in a transport line, foul a production facility, alter wettability of crude oil, or poison a refinery catalyst.

The methods herein are further illustrated by the following non-limiting examples.

Example 1

Crude oil is placed in a vessel. The vessel is heated from 25° C. to 450° C. at a rate of 10° C./min, generating a final pressure of about 1500 psi. 2,5-bis(tert-butylperoxy)-2,5-dimethylhexane is injected into the vessel. In some runs, the 2,5-bis(tert-butylperoxy)-2,5-dimethylhexane is dissolved in a solvent (e.g., benzene) before injection. The elevated temperature and pressure are maintained for 16 hours as the crude oil reacts to produce upgraded oil. The vessel is cooled to room temperature. The viscosity of the upgraded oil is less than the crude oil and the crude oil subjected to the similar treatment without the injection of radical initiator. The API gravity of the upgraded oil is greater than the crude oil and the crude oil subjected to the similar treatment without the injection of radical initiator.

Example 2

Crude oil is placed in a vessel. The vessel is heated from 25° C. to 400° C. at a rate of 10° C./min, generating a final pressure of about 1300 psi. Dimethyl 2,2'-azobis(2-methylpropionate) is injected into the vessel. In some runs, the 2,2'-azobis(2-methylpropionate) is dissolved in an organic solvent (e.g., toluene) before injection. The elevated temperature and pressure are maintained for 24 hours as the crude oil reacts to produce upgraded oil. The vessel is cooled to room temperature and sampled. The viscosity of the upgraded oil is less than the crude oil and the crude oil subjected to the similar treatment without the injection of radical initiator, and the API gravity of the upgraded oil is greater than the crude oil and the crude oil subjected to the similar treatment without the injection of radical initiator.

While one or more embodiments have been shown and described, modifications and substitutions may be made thereto without departing from the spirit and scope of the invention. Accordingly, it is to be understood that the present invention has been described by way of illustrations and not limitation. Embodiments herein are can be used independently or can be combined.

All ranges disclosed herein are inclusive of the endpoints, and the endpoints are independently combinable with each other. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive, rather the elements can be used separately or can be combined together under appropriate circumstances.

What is claimed is:

1. A method for upgrading heavy oil, the method comprising:
    disposing an initiator in a heavy oil environment, the heavy oil environment including a heavy oil;
    producing a radical from the initiator; and
    contacting the heavy oil with the radical; and
    converting the heavy oil to upgraded oil;
    wherein converting the heavy oil comprises:
    abstracting a hydrogen atom from the heavy oil with the radical to form a product radical from the heavy oil; and
    subjecting the product radical to a β-scission reaction.

2. The method of claim 1, wherein converting the heavy oil comprises cracking the heavy oil.

3. The method of claim 1, further comprising varying the amount of the initiator or the radical present in the heavy oil environment to control upgrade of the heavy oil.

4. The method of claim 1, wherein producing a radical from the initiator comprises heating the initiator by subjecting the initiator to in-situ combustion, cyclic steam stimulation, steam flooding, steam assisted gravity drainage, hot solvent injection, electromagnetic radiation, a shock wave, acoustic cavitation, electric discharge, or a combination comprising at least one of the foregoing,
    wherein the electromagnetic radiation comprises a microwave frequency, radio frequency, or a combination comprising at least one of the foregoing.

5. The method of claim 4, wherein the initiator is disposed in the heavy oil environment prior to the heating.

6. The method of claim 4, wherein heating includes increasing a temperature of the heavy oil environment from 100° C. to 1000° C.

7. The method of claim 6, wherein the heating includes increasing the temperature of the radical to a temperature effective for the radical to abstract hydrogen atoms from the heavy oil at a rate greater than a rate for recombination of radicals or a rate for crosslinking of the heavy oil.

8. The method of claim 1, further comprising heating the heavy oil environment,
wherein heating comprises in-situ combustion, cyclic steam stimulation, steam flooding, steam assisted gravity drainage, hot solvent injection, or a combination comprising at least one of the foregoing.

9. The method of claim 1, wherein the heavy oil comprises a wax, asphaltene, resin, paraffin, naphthene, olefin, or a combination comprising at least one of foregoing.

10. The method of claim 1, wherein the initiator comprises a peroxide, azo compound, ether, or a combination comprising at least one of the foregoing.

11. The method of claim 10, wherein the initiator is the peroxide which comprises tert-amyl peroxybenzoate; 4,4-azobis(4-cyanovaleric acid); 1,1'-azobis(cyclohexanecarbonitrile); 2,2'-azobisisobutyronitrile; benzoyl peroxide; 2,2-bis(tert-butylperoxy)butane; 1,1-bis(tert-butylperoxy) cyclohexane; 2,5-bis(tert-butylperoxy)-2,5-dimethylhexane; 2,5-bis(tert-butylperoxy)-2,5-dimethyl-3-hexyne; bis(1-(tert-butylperoxy)-1-methylethyl)benzene; 1,1-bis(tert-butylperoxy)-3,3,5-trimethylcyclohexane; tert-butyl hydroperoxide; tert-butyl peracetate; tert-butyl peroxide; tert-butyl peroxybenzoate; tert-butylperoxy isopropyl carbonate; cumene hydroperoxide; cyclohexanone peroxide; dicumyl peroxide; lauroyl peroxide; 2,4-pentanedione peroxide; peracetic acid; potassium persulfate; acetone peroxide; methyl ethyl ketone peroxide; 1,3,3,3-tetramethylbutyl peroxybenzoate; tert-amyl peroxy-m-methylbenzoate; tert-hexyl peroxy-m-methylbenzoate; 1,1,3,3-tetramethylbutyl peroxy-m-methylbenzoate; tert-hexyl peroxy-p-methylbenzoate; tert-hexyl peroxy-o-methylbenzoate; tert-hexyl peroxy-p-chlorobenzoate; bis(tert-hexyl peroxy)phthalate; bis(tert-amyl peroxy)isophthalate; bis(tert-hexyl peroxy) isophthalate; bis(tert-hexyl peroxy)terephthalate; tris(tert-hexyl peroxy)trimellitate; 1,1-bis(tert-hexylperoxy)-3,3,5-trimethylcyclohexane; 1,1-bis(tert-hexylperoxy) cyclohexane; 1,1-bis(tert-butylperoxy)cyclododecane; 2,2-bis(tert-butylperoxy)octane; n-butyl-4,4-bis(tert-butylperoxy)butane; n-butyl-4,4-bis(tert-butylperoxy) valerate; tert-butyl cumyl peroxide; α,α'-bis(tert-butylperoxy-m-isopropyl)benzene; α,α'-bis (tertbutylperoxy)diisopropylbenzene; 2,5-dimethyl-2,5-di(t-butylperoxy)hexane; acetyl peroxide; isobutyryl peroxide; octanoyl peroxide; decanoyl peroxide; 3,5,5-trimethyl hexanoyl peroxide; 2,4-dichlorobenzoyl peroxide; m-toluoyl peroxide; tert-butyl peroxyacetate; tert-butyl peroxyisophtalate; tert-butyl peroxy-2-ethylhexanoate; tert-butyl peroxylaurate; tert-butyl peroxybenzoate; di-tert-butyl peroxyisophthalate; 2,5-dimethyl-2,5-di(benzoylperoxy)hexane; tert-butyl peroxymaleic acid; tert-butyl peroxyisopropylcarbonate; cumyl peroxyoctate; tert-butyl hydroperoxides; cumene hydroperoxides; diisopropylbenzene hydroperoxides; 2,5-dimethylhexane-2,5-dihydroperoxide; 1,1,3,3-tetramethylbutyl hydroperoxides; hydrogen peroxide; or a combination comprising at least one of the foregoing.

12. The method of claim 1, further comprising introducing a solvent,
wherein the solvent comprises a naphtha, $CO_2$, $CS_2$, hydrocarbon which includes a C1 to C12 alkane, C1 to C12 alkene, C3-C20 aromatic; or a combination comprising at least one of the foregoing.

13. The method of claim 1, further comprising decreasing an average molecular weight of the heavy oil, wherein the upgraded oil has a lower average molecular weight than that of the heavy oil.

14. The method of claim 1, wherein the upgraded oil has an API gravity greater and lower viscosity than that of the heavy oil.

15. The method of claim 1, wherein disposing the initiator comprises disposing the initiator outside of a combustion zone.

16. The method of claim 1, wherein the heavy oil environment is a reservoir, borehole, processing facility, downhole, refinery, pre-refinery facility, production zone, formation, tubular, reactor, or a combination comprising at least one of the foregoing.

17. The method of claim 1, wherein disposing the initiator in the heavy oil environment comprises injecting the initiator in an injection well, which is different than a production well.

18. A method for upgrading heavy oil, the method comprising:
disposing an initiator in a heavy oil environment, the heavy oil environment including a heavy oil;
producing a radical from the initiator; and
contacting the heavy oil with the radical; and
converting the heavy oil to upgraded oil;
wherein the initiator is the azo compound which comprises 2,2'-azobis[2-(2-imidazolin-2-yl)propane]dihydro chloride; 2,2'-azobis[2-(2-imidazolin-2-yl)propane]disulfate dehydrate; 2,2'-azobis(2-methylpropionamidine) dihydrochloride; ,2'-azobis[n-(2-carboxyethyl)-2-methylpropionamidine]hydrate; 2,2'-azobis{2-[1-(2-hydroxyethyl)-2-imidazolin-2-yl] propane}dihydrochloride; 2,2'-azobis[2-(2-imidazolin-2-yl)propane]; 2,2'-azobis(1-imino-1-pyrrolidino-2-ethylpropane)dihydrochloride; 2,2'-azobis{2-methyl-n-[1,1-bis(hydroxymethyl)-2-hydroxyethyl] propionamide}; 2,2'-azobis[2-methyl-n-(2-hydroxyethyl)propionamide]; 2,2'-azobis(4-methoxy-2,4-dimethyl valeronitrile); 2,2'-azobis(2,4-dimethyl valeronitrile); dimethyl 2,2'-azobis(2-methylpropionate); 2,2'-azobis(2-methylbutyronitrile); 1,1'-azobis (cyclohexane-1-carbonitrile); 2,2'-azobis[n-(2-propenyl)-2-methylpropionamide]; 1-[(1-cyano-1-methylethyl)azo]formamide; 2,2'-azobis(n-butyl-2-methylpropionamide); 2,2'-azobis(n-cyclohexyl-2-methylpropionamide); or a combination comprising at least one of the foregoing.

19. A method for upgrading heavy oil, the method comprising;
disposing an initiator in a heavy oil environment, the heavy oil environment including a heavy oil;
producing a radical from the initiator; and
contacting the heavy oil with the radical; and
converting the heavy oil to upgraded oil;
wherein disposing the initiator in the heavy oil environment comprises injecting the initiator in a production well.

20. The method of claim 1, wherein the heavy oil environment is a reservoir, borehole, downhole, production zone, formation, tubular, or a combination comprising at least one of the foregoing.

* * * * *